Sept. 7, 1943.                 R. T. COOK ET AL                 2,328,708
                               OPHTHALMIC MOUNTING
                            Original Filed June 29, 1938
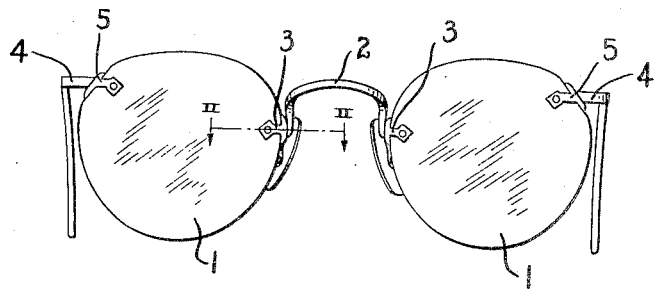
Fig. I
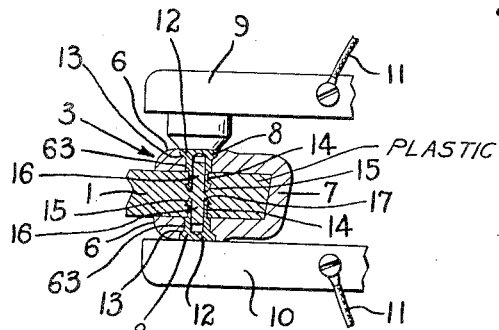     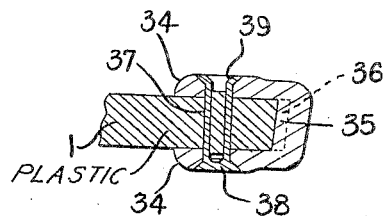
Fig. II                   Fig. III
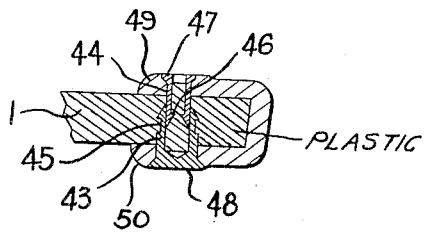     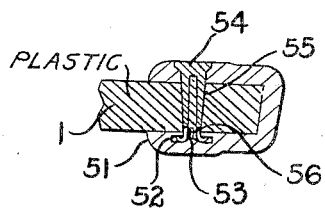
Fig. IV                   Fig. V
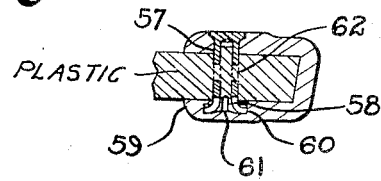
Fig. VI
INVENTOR.
ROLAND T. COOK
WILFRID A. BONIN
BY
                ATTORNEY.

Patented Sept. 7, 1943

2,328,708

UNITED STATES PATENT OFFICE 2,328,708

OPHTHALMIC MOUNTING

Roland T. Cook, Irvington, N. J., and Wilfrid A. Bonin, Southbridge, Mass., assignors to American Optical Company, Southbridge, Mass., a voluntary Association of Massachusetts Original application June 29, 1938, Serial No. 216,526. Divided and this application July 5, 1940, Serial No. 344,035

4 Claims. (Cl. 88—47)

This invention relates to improvements in ophthalmic mountings and has particular reference to improved means and methods of connecting the lenses to the lens holding means of such mountings, and is a division of application Serial No. 216,526, filed June 29, 1938.

One of the principal objects of the invention is to provide improved means and methods of connecting the lenses of an ophthalmic mounting to their lens holding means in such a manner as to avoid the preforming of connection openings in the lenses.

Another object is to provide novel means and methods of connecting lens holding means to lenses formed of material having the characteristics of an artificial resin, such as methyl methacrylate, etc.

Another object is to provide a novel method of securing lenses of the above character to their holding means whereby the material of the said lenses aids in retaining the lens holding means in desired position thereon.

Another object is to provide connection means which may be heated and pressed through an opening in lens holding means, when in position on the lens, and into the body of the lens to cause the material of the lens to soften under the action of the heat and flow about the rivet, and, when cool, to harden and secure the rivet in position therein.

Another object is to provide novel means and methods of connecting lenses of an ophthalmic mounting to their lens holding means whereby a portion of the body of a lens may be displaced into connected relation with a portion of the lens holding means and simultaneously have a connection member embedded therein.

Other objects and advantages of the invention will become apparent from the following description taken in connection with the accompanying drawing, and it will be apparent that many changes may be made in the arrangement of parts, details of construction and methods shown and described without departing from the spirit of the invention as expressed in the accompanying claims. We, therefore, do not wish to be limited to the exact details of construction, arrangement of parts and methods shown and described, as the preferred forms only have been given by way of illustration.

Referring to the drawing:

Fig. I is a front elevation of an ophthalmic mounting embodying the invention;

Fig. II is an enlarged fragmentary sectional view illustrating one of the steps of the method of connecting the lens holding means to the lens, and illustrating an enlarged sectional view through a lens holding means and lens, taken as on line II—II of Fig. I and looking in the direction illustrated by the arrows; and Figs. III to VI, inclusive, are sectional views, similar to Fig. II, illustrating different modifications of the invention.

Ophthalmic lenses, in the past, have usually been formed of glass having a fragile nature. It has been usual in connecting such lenses to the lens holding means or lens straps of an ophthalmic mounting, to form connection openings in the lenses in aligned relation with suitable connection openings formed in the lens holding means or straps. Such openings were to receive separate connecting means by which the lenses were secured to said holding means or straps.

Much difficulty has been encountered in properly fitting and securing such prior art lens straps to the lenses, particularly in instances where it was desired to have the lens straps connected in relatively rigid relation with the lenses. This difficulty was due primarily to the inability of the connection openings to be formed in proper relation with respect to the edges of the lenses. If said connection openings were formed too close to the edges of the lenses, the lens holding means or lens straps would fit loosely thereon. If, on the other hand, the openings were spaced inwardly of the edges a greater amount than necessary, the openings in the strap and lens could not be aligned and, therefore, could not be connected. Great care, therefore, had to be taken to be sure the openings were in proper alignment when the parts were in desired fitted relation with each other.

Such connection openings were formed in the lenses by a separate drilling operation and, because of the fact that most prior art lenses were formed of glass having an exceptionally fragile nature, such drillings were exceptionally difficult and painstaking operations.

Disalignment of the connection openings also caused a strain to be set up in the lenses when the connection means were inserted in the connection openings, and such strain, in many instances in the past, caused the lenses to break and become impractical for use.

It, therefore, is one of the primary objects of this invention to overcome the above difficulties by providing lenses formed of resinous material having the characteristics of methyl methacrylate and a method of assembling and connecting such lenses with the lens holding means of the mounting whereby said lens holding means may be connected in positive rigid relation with the lenses without the necessity of first forming and aligning connection openings, and has particular reference to the novel method of connecting the lens holding means to the lenses whereby the material of the lens aids in holding the connecting means used in securing the lens holding means or lens straps to the lenses.

Referring more particularly to the drawing wherein like reference characters refer to like parts throughout the several views:

The ophthalmic mounting embodying the invention comprises a pair of lenses 1 having a bridge member 2 connected thereto by suitable lens straps or lens holding means 3. Suitable temple supports 4 are connected to the lenses by lens straps or lens holding means 5, having characteristics similar to lens straps or lens holding means 3.

The lens straps 3 or 5, as the case may be, as shown in Fig. II, are provided with ears 6, shaped to overlie the side surfaces of the lens 1 and having a portion 7 shaped to overlie the edge of the lens. The portions 6 are provided with openings 63 through which suitable connecting means 8 may be extended, as shown in Fig. II. A pair of pliers or other means having spaced jaws 9 and 10 may be used for pressing the connecting means 8 into the body of the lens. It is to be particularly noted that the lens 1, prior to the insertion of the connection means 8 therein, is not perforated. The jaws 9 and 10, prior to exerting pressure on the means 8, may be connected as through the lead wires 11 to an electrical heating unit not shown, so that said jaws may be heated a controlled amount and thereby cause the connecting means to be heated prior to exerting pressure thereon. The intensity of the heat is carefully controlled so that it will be just sufficient to enable the connecting means 8 to move fairly freely into the main body portion of the lens 1 when pressure is exerted on the portions 9 and 10; and such as to cause the material of the lens to flow slightly about the connecting means and assume a substantially intimate relation with the outer contour surface of the connecting means when the heat is shut off and the material of the lens is allowed to cool. In this instance, the connecting means 8 is provided with an enlarged head 12 shaped to fit within a similar shaped countersink 13 formed in alignment with the opening 63 in the strap ear 6.

The connecting means 8 is provided with a body portion having a circumferential groove 14 therein, in which the material of the lens 1 is adapted to flow when softened under the action of the heat. The said connecting means 8 also has a tapered end 15 and a hollow bore 16 forming a knife-like edge 17 which is adapted to cleave its way into the material of the lens when pressure is exerted on said connecting means.

Similar connecting means 8 is placed in the opening in the opposed strap ear 6, as illustrated in Fig. II. The length of said connecting means 8 is controlled according to the thickness of the lens 1, and is such that the said connecting means may be completely embedded in the body portion of the lens with the head portion 12 fitting within the countersink 13. It is to be understood that the lens holding means or lens strap 3 is located in desired position on the lens and is held in desired fitted position with the lens during the process of embedding the connecting means 8 therein. This arrangement provides means and method for insuring a relatively rigid connection of the lens strap or lens holding means with the lens.

Fig. III illustrates a modification wherein the lens strap or lens holding means is provided with spaced perforated ears 34 and with a portion 35 overlying the edge of the lens and having a key 36 adapted to fit within a slot formed in the edge of the lens. The connecting means, in this instance, is in the form of a tubular member 37, having an enlarged closed end 38. The tubular member is heated and pressed through the opening in one of said ears, through the lens, and into the opening in the opposed ear, an amount sufficient to engage the enlarged end 38 with its adjacent strap ear. The opposite end of the tubular member 37 is thereafter deflected outwardly, as illustrated at 39, by a suitable tool to cause the said end 39 to be forced into binding relation with the other of said strap ears. It is to be understood that the key 36 and slot are in proper fitted relation with each other prior to the insertion of the connecting means 37.

Fig. IV illustrates a further modification wherein a pair of connecting members 43 and 44 of different diameters are used. The connecting members are adapted to be inserted from opposite sides of the strap and forced into telescoped relation with each other. The member 43 is provided with a circumferential groove 45 in the outer surface thereof adapted to assume an interlocked relation with the lens when forced therein. The member 44 is provided with an internal shouldered ridge 46 which, when forced into telescoped relation with the member 43, is adapted to interlock with the material of the lens which enters the hollow bore of the member 43 when the said member is forced into the lens. Both of said connecting members are provided with side walls which taper into a knife-like edge adjacent the ends which are forced into the lens and are provided, adjacent their opposite ends, with enlarged heads 47 and 48 which are adapted to assume a seated relation within suitable counterbores or countersinks in the perforated ears 49 and 50 of the lens strap. This arrangement provides means whereby the strap may be quickly and easily fitted and connected to lenses of varying thicknesses, as the telescoping characteristics of the connecting means will compensate for said thickness variations. The inner surface of the hollow bore of the member 43 may be provided with projections or grooves to interlock with the material of the lens which is forced inwardly thereof when the said member is pressed into the lens.

Fig. V illustrates a further modification wherein one of the strap ears 51 is provided with a shouldered recess 52 having a slightly raised portion 53 therein. The connecting means, in this instance, is in the form of a hollow rivet or pin having an enlarged head 54 and hollow body portion 55. The outer surface of the body portion 55 is tapered toward its end opposite the head 54 and the said end is provided with a plurality of slots 56 which, when the body portion is pressed through the lens, and the end of the body portion engages the raised portion 53, inwardly of the shouldered recess 52, allows the side walls of the slotted end to be deflected outwardly by the raised portion 53 and interlock with the shoulders of the recess 52. In this instance, only one of the strap ears is formed with a perforation so that the binding action imparted by the connecting means 55 is brought about through the engagement of the enlarged head 54 with one of the strap ears and the anchoring of the opposed end of said connecting means inwardly of the shouldered recess 52 by causing the deflection of the slotted end of said connecting means inwardly of said shouldered recess. The width of the recess is such that, if a relatively thin lens is being connected to the lens strap, more of the slotted end of the connected means may be displaced within the recess and thereby compensate for the thinness of the lens. If the lens is relatively thick a less amount of the slotted end of the lens will be deflected inwardly of the recess. A single connecting member 55 may, therefore, be provided for use in connecting the lens straps to lenses of varying thickness.

Fig. VI illustrates a further modification which utilizes connecting means 57 generally similar to the connecting means 55. That is, the said connecting means 57 has a plurality of slots 58 therein, simulating the slots 56 in the member 55, and the strap ear 59 is provided with a shouldered recess 60 having a raised portion 61 thereof in simulating the recess 52 and raised portion 53, the construction being shown in Fig. V. The connecting means 57, however, is provided with a plurality of openings 62 in the main hollow body portion thereof. These openings, during the process of assembling the strap and lens under the action of heat, allow the material displaced inwardly of the hollow bore of the connecting member 57 to flow outwardly through the plurality of openings 62 and integrally unite with the material of the lens surrounding said hollow portion. It is to be understood that this action takes place substantially instantaneously as the connecting means is forced into connected relation with the strap and lens.

The intensity of the heat of the connecting means, prior to its being forced inwardly of the lens, is carefully controlled so that the material of the lens engaged and heated by said rivet will flow sufficiently freely to integrally join through said openings 62. The composition, from which the lenses are formed, has characteristics which permit it to flow quite freely when subjected to heat of comparatively low intensity, as compared with lenses formed of glass, and which permit it to harden quite quickly on cooling.

It is to be understood that the connecting means may or may not be circular in cross sectional shape, as it is apparent that they may be formed rectangular, oval or any other shape desired. In instances wherein the connecting members telescope with each other, as illustrated in Fig. IV, the cross sectional shapes of said connecting members will obviously have to be similar.

The composition of the lenses described herein is of a resinous nature having the characteristics of methyl methacrylate. There are several of these compositions in commercial use today. These are put out under various names such as Plexiglas, Lucite, Metastyrol, etc. There are also certain commercial phenolic condensation products that may be used, such as Bakelite, Catalin, Marblette and Fiberlon. Materials having the characteristics of methyl methacrylate are clear and transparent and are exceptionally resistant to acids, corrosion, weathering, etc. Such materials are exceptionally light in weight and have a relatively tough, non-frangible nature. Another feature of great importance is that said materials are relatively non-inflammable. It is, therefore, possible to use heated type connection means such as described above for uniting the lens straps or lens holding means with such lenses without the danger of igniting the lenses.

It is to be borne in mind that the temperature of the heat used is only such as to permit the connecting means to be easily forced into the composition of the lens and is only sufficient to cause the composition of the lens in immediate engagement with the connecting means to materially soften and flow. This is important when it is desired to form a rigid and positive connection between the lens strap and the lens.

It is to be understood that any of the strap and lens arrangements described herein may be provided with a peripheral tongue and groove such as shown in Fig. III.

The process of connecting the lens straps or lens holding means with the lenses is substantially as follows:

The lens 1 is first shaped to the desired contour shape. The lens strap, or lens holding means, is then fitted, as by bending the lens face engaging ears, etc. to fit snugly with said lens. The strap is positioned and held in desired fitted relation with the lens. The connecting means which is to be used in connecting the strap to the lens is placed in the opening in one of the lens strap ears and held in position by means of the clamp jaws of a pair of pliers or other suitable means. The jaws are then heated to a temperature which, under pressure exerted on said jaws, will enable the connecting means to move fairly freely inwardly of the body portion of the lens. The parts are held in this relation and allowed to cool and set. Upon hardening, the material of the lens grips the connecting means and rigidly holds the parts in assembled relation with each other.

It is to be understood that the heat is only sufficient to cause the material of the lens to flow to the outer or inner contour shape of the connecting means so that, when allowed to cool, the connecting means and the material of the lens adjacent the connecting means will be relatively intimately fitted with each other.

The connecting means are preferably formed of a metal or material which may be heated more readily than the metal or material of the lens strap or lens holding means so that when the heated jaws are moved into engagement with said lens strap and said connecting means, the said connecting means will heat more quickly. It is also to be understood that the heating device may be so arranged as to direct the major portion of its heating to said connecting means.

The heating unit may be of the electrical type commonly known in the art, in which instance the rivets or connecting means could be formed of a metal such as Inconel, Nichrome, Chromel, or the like, having a high resistance and the lens straps or lens holding means formed of a metal or alloy, such as copper alloy or the like having a low resistance so that the heating will take place in the rivet or connecting means rather than in the lens strap. This step of heating is carefully controlled so that it will not in any way injure or spoil the connection. If an electrical type heating unit is used, wherein the heat is generated very quickly, the said device is snapped on and quickly snapped off.

The rivets of the various structures shown are provided with hollow bores so that they have a combined punch and riveting function. It is apparent that the hollow bore, when pressed into the material of the lens under the action of the heat, will cut out a plug-like piece during its inward movement through the lens.

Should the material of the lens, forced inwardly of the hollow bore of the pin, of the connecting means, protrude from said connecting means, after the parts have been united, said material may be extracted from the connecting means or cut off flush with the head of the connecting means.

It is to be understood that the lens straps 3 may be connected to the bridge, temple supports, or other parts of the ophthalmic mounting, which are to be assembled with the lenses, as by any of the usual methods known to the art.

From the foregoing description it will be seen that simple, efficient and economical means and methods have been provided for quickly and easily attaching the lens holding means of composition type lenses to said lenses, particularly novel means and methods whereby the connecting means may be forced into rigid connected relation with the lens and lens holding means without first forming a connection opening in the lens.

We claim:

1. A device of the character described for use with a normally imperforate lens of resinous material, a lens holding means comprising portions shaped to overlie the opposed surfaces of the lens and a portion shaped to overlie an edge of the lens, said portions shaped to overlie the opposed surfaces of the lens having apertures therein, connecting means comprising two portions, one of which is insertable through the aperture in one of the portions shaped to overlie the opposed surfaces of the lens and to extend into the body of the lens and the other being insertable in the aperture in the other of said portions shaped to overlie the opposed surfaces of the lens and adapted to fit into telescoping relation with the first connecting means portion, one of said connecting means portions having an external protuberance thereon for interlocking said connecting means portion with the lens, the diameter of said protuberance being substantially equivalent to the diameter of the aperture for receiving the connecting means portion, the other of said connecting means portions being partially insertable within the first mentioned connecting means portion, and a locking protuberance internally of said other connecting means portion for intimately engaging a portion of the lens within the confines of said other connecting means portion to moldably lock the other connecting means portion in fixed relation with the lens holding means and the lens.

2. A device of the character described for use with a normally imperforate lens of resinous material, a lens holding means comprising portions shaped to overlie the opposed surfaces of the lens and a portion shaped to overlie an edge of the lens, said portions shaped to overlie the opposed surfaces of the lens having apertures therein, connecting means comprising two portions, one of which is insertable through the aperture in one of the portions shaped to overlie the opposed surfaces of the lens and to extend into the body of the lens and the other being insertable in the aperture in the other of said portions shaped to overlie the opposed surfaces of the lens and adapted to fit into telescoping relation with the first connecting means portion, one of said connecting means portions having an aperture in both ends thereof, one of said connecting means portions having an external shoulder thereon for interlocking said connecting means portion with the lens, the diameter of said shoulder being substantially equivalent to the diameter of the aperture for receiving the connecting means portion, the other of said connecting means portions being partially insertable within the first mentioned connecting means portion, and a locking protuberance internally of said other connecting means portion for intimately engaging a portion of the lens within the confines of said other connecting means portion to lock the other connecting means portion in fixed relation with the lens, to the end that the connecting means portions are locked in interfitting relation with each other and the lens to secure the lens holding means in fixed relation therewith.

3. An ophthalmic mounting comprising a pair of normally imperforate lenses of resinous material, lens holding means having portions overlying the opposed side surfaces of the lens and a portion overlying an edge of the lens, said portions overlying the opposed side surfaces of the lens having connection openings therein, connecting means in said connection openings exteding into said lens and securing said lens holding means to said lenses, said connecting means comprising a pair of connection members each having an enlarged head and a hollow body portion extending substantially from adjacent the head throughout the remainder of the connection member, with the enlarged heads being adjacent the outer ends of said pair of connection members with one of said connection members having an aperture in its respective head, a lead-in edge portion on each of the connection members opposite the head, a locking shoulder on each of said connection members adjacent the lead-in edge portion of said connection members, said connection members being in telescoped relation with each other to fit in intimate relation with each other, with the locking shoulder on each of said connection members gripping a portion of the lens material to secure the lens holding means in fixed relation with the lens.

4. In the method of assembling the parts of an ophthalmic mounting, the steps comprising forming an ophthalmic lens of transparent moldable plastic material with continuous imperforate surfaces, placing on said lens lens holding means having spaced perforated ears for engaging the opposite sides of the lens, heating and pressing a connection member having an enlarged head adjacent one end thereof and a main tubular-like body portion having protuberance means on a side surface thereof through the perforation in one of said ears and into the material of the lens for interlocking said protuberance means with the material of said lens, heating and pressing another connection member having an enlarged head adjacent one end thereof and a tubular-like body portion having protuberance means on a side surface thereof through the perforation in the other of said ears and into the material of the lens and to position a portion thereof internally of the tubular portion of the first connection member and to cause the protuberance means on the side surface thereof to interlock with the material of the lens to anchor the connection member with the material of the lens for holding the lens holding means and lens in assembled relation with each other.

ROLAND T. COOK.
WILFRID A. BONIN.